United States Patent
Sanderson et al.

(10) Patent No.: US 11,367,135 B2
(45) Date of Patent: *Jun. 21, 2022

(54) SYSTEMS AND METHODS FOR INTELLIGENTLY OPTIMIZING A QUEUE OF ACTIONS IN AN INTERFACE USING MACHINE LEARNING

(71) Applicant: Capital One Services, LLC, McLean, VA (US)

(72) Inventors: Drake R. Sanderson, The Colony, TX (US); Sohan Ganapathy, Mississauga (CA); Jesus Gonzalez, Arlington, TX (US); Natascha Schambach, Aubrey, TX (US); Krishna Mohan Bibireddy, McKinney, TX (US); Biraja Mahapatra, Frisco, TX (US); Thomas Busath, Celina, TX (US); Taylor Geron, Falls Church, VA (US); Nicole Kellogg, Prosper, TX (US); Amanda Rae Dorsey, Lewisville, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/200,530

(22) Filed: Mar. 12, 2021

(65) Prior Publication Data
US 2021/0201405 A1 Jul. 1, 2021

Related U.S. Application Data

(63) Continuation of application No. 16/660,751, filed on Oct. 22, 2019, now Pat. No. 10,977,728.

(51) Int. Cl.
*G06Q 40/00* (2012.01)
*G06Q 40/02* (2012.01)
(Continued)

(52) U.S. Cl.
CPC .......... *G06Q 40/025* (2013.01); *G06F 17/18* (2013.01); *G06K 9/6256* (2013.01); *G06N 20/00* (2019.01)

(58) Field of Classification Search
CPC .... G06Q 40/025; G06F 17/5009; G06F 17/18
See application file for complete search history.

(56) References Cited

U.S. PATENT DOCUMENTS

| 8,606,695 | B1 * | 12/2013 | Arora | G06Q 40/02 705/38 |
| 2007/0276749 | A1 * | 11/2007 | Vagim | B82Y 15/00 705/38 |

(Continued)

OTHER PUBLICATIONS

Natekin, Alexey (Gradient boosting machines, a tutorial, https://www.frontiersin.org/articles/10.3389/fnbot.2013.00021/full, Dec. 4, 2013). (Year: 2013).*

*Primary Examiner* — Elizabeth H Rosen
*Assistant Examiner* — Mark H Gaw
(74) *Attorney, Agent, or Firm* — Hunton Andrews Kurth LLP (57) ABSTRACT

Systems and methods for optimizing processing of loan applications are disclosed. A system may include one or more memory devices storing instructions and one or more processors configured to execute the instructions. The instructions may instruct the system to analyze training data to build a predictive model. The instructions may also instruct the system to apply the predictive model to a loan application to determine a first probability of an institution funding the loan application if the institution proactively engages a loan-arranging entity of the loan application and a second probability of the institution funding the loan application if the institution reactively engages the loan- (Continued)

arranging entity. The instructions may further instruct the system to reporting the first and second probabilities to a user through a user interface.

20 Claims, 4 Drawing Sheets

(51) Int. Cl.
*G06F 17/18* (2006.01)
*G06K 9/62* (2022.01)
*G06N 20/00* (2019.01)

(56) References Cited

U.S. PATENT DOCUMENTS

| | | | |
|---|---|---|---|
| 2012/0323760 A1* | 12/2012 | Lee | G06Q 40/02 705/38 |
| 2017/0161826 A1* | 6/2017 | Packer | G06Q 40/025 |
| 2018/0075175 A1* | 3/2018 | Chang | G06Q 40/025 |

* cited by examiner

| | | DATE | DEALER | SUBMITTER | CUSTOMER | TYPE | TIER | CALLBACK | MESSAGE | STATE |
|---|---|---|---|---|---|---|---|---|---|---|
| All Approvals | Within last week ⌄ | | | | SMARTQUEUES On | | | | ↻ Refresh | |
| 404 | | 06/03/19 12:05 PM | Dealer ABC | Joe Smith (123) 456-7890 | Customer Name1 Customer ID1 | | 3 | As Submitted | 🗨 | 🔒 🗑 ARCHIVED |
| | | 05/31/19 1:16 PM | Dealer DEF | John Submitter (309) 341-4567 | Customer Name2 Customer ID2 | | 6 | Counter | 🗨 | 🔒 🗑 |
| Dealers ^ Lookup Dealers 🔍 | | | | | | | | | | |
| Dealer Type ^ ☐ Type 1 ☐ Type 2 ☐ Type 3 ☐ Type 4 ☐ Type 5 ☐ Type 6 | | 05/31/19 4:28 PM | Dealer GHJ | Leo Green (202) 345-1234 | Customer Name3 Customer ID3 | | 4 | Counter | 🗨 | 🔒 🗑 |
| | | 05/31/19 10:31 AM | Dealer HJK | David Black (712) 555-3344 | Customer Name4 Customer ID4 | | 4 | As Submitted | 🗨 | 🔒 🗑 |
| Service Levels ^ ☐ Level 1 ☐ Level 2 ☐ Level 3 ☐ Level 4 | | 06/01/19 11:27 AM | Dealer WER | Kirk Manager (563) 335-0000 | Customer Name5 Customer ID5 | | 8 | As Submitted | 🗨 | 🔒 🗑 ARCHIVED |
| Application Type ^ | | 05/31/19 2:09 PM | Dealer XYZ | John Green (555) 987-6543 | Customer Name6 Customer ID6 | | 4 | Counter | 🗨 | 🔒 🗑 |

FIG. 4

SYSTEMS AND METHODS FOR INTELLIGENTLY OPTIMIZING A QUEUE OF ACTIONS IN AN INTERFACE USING MACHINE LEARNING

CROSS REFERENCE TO RELATED APPLICATION

This application is a continuation of U.S. patent application Ser. No. 16/660,751 filed Oct. 22, 2019, the complete disclosure of which is incorporated herein by reference in its entirety.

TECHNICAL FIELD

The present disclosure generally relates to data processing systems, and more particularly, to systems and methods for intelligently optimizing a queue of actions in an interface using machine learning.

BACKGROUND

Consumers often seek financing from institutions to finance certain types of purchases, including, for example, automobile purchases. Automobile dealerships may act as loan-arranging entities who help arrange the financing, and they typically send loan applications to multiple financial institutions (e.g., prospective lenders), who may competitively bid to fund the loan applications. Relationship managers or loan officers working for the institutions may evaluate the loan applications and seek to originate the loans on terms that are acceptable to the institutions, the dealers, and the consumers.

One of the jobs of a relationship manager may be to contact the dealerships regarding the loan applications assigned to the relationship manager. Contacting the dealerships may help improve the likelihood that the loan applications will be funded through the institutions for whom the relationship manager works. To that end, the relationship manager may utilize a tool capable of providing an interface allowing the relationship manager to view and track the loan applications assigned to the relationship manager. The relationship manager may also utilize the interface to work on the loans back and forth with the dealerships.

Existing tools, however, have deficiencies including the inability to intelligently prioritize actions for the relationship manager. Due to the high volume of loan applications pending review by the relationship manager, the relationship manager may not be able to evaluate every application manually. The relationship manager may therefore be forced to rely on his or her experience to prioritize and decide which loan applications to engage. Such decisions are often suboptimal.

Accordingly, a need exists for improved systems and methods for intelligently optimizing a queue of actions in an interface.

BRIEF SUMMARY

The disclosed embodiments include systems and methods for intelligently optimizing a queue of actions in an interface. In some embodiments, the queue of actions may relate to intelligent processing of loan applications.

In one embodiment, a system is disclosed. The system may include one or more memory devices storing instructions and one or more processors configured to execute the instructions. The instructions may instruct the system to analyze training data to build a predictive model. The instructions may also instruct the system to apply the predictive model to a loan application to determine a first probability of an institution funding the loan application if the institution proactively engages a loan-arranging entity of the loan application and a second probability of the institution funding the loan application if the institution reactively engages the loan-arranging entity. The instructions may further instruct the system to reporting the first and second probabilities to a user through a user interface.

In another embodiment, a method is disclosed. The method may include analyzing training data to build a predictive model. The method may also include applying the predictive model to a plurality of loan applications to determine a first probability of an institution funding the loan applications if the institution proactively engages loan arranging entities of the loan applications and a second probability of the institution funding the loan applications if the institution reactively engages the loan arranging entities of the loan applications. The method may further include ranking the loan applications based on the first and second probabilities and reporting the loan applications in a ranking order to a user through a user interface.

In another embodiment, a non-transitory memory is disclosed. The non-transitory memory may store instructions that, when executed by at least one processor, cause a system to perform operations. The operations may include analyzing training data to build a predictive model. The operations may also include applying the predictive model to a plurality of loan applications, to determine a first probability of an institution funding the loan applications if the institution proactively engages loan-arranging entities of the loan applications and a second probability of the institution funding the loan applications if the institution reactively engages the loan-arranging entities of the loan applications. The operations may further include ranking the loan applications based on the first and second probabilities and reporting the loan applications in a ranking order to a user through a user interface.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary disclosed embodiments and, together with the description, serve to explain the disclosed embodiments. In the drawings.

DETAILED DESCRIPTION

Reference will now be made to exemplary embodiments, examples of which are illustrated in the accompanying drawings and disclosed herein. Wherever convenient, the same reference numbers will be used throughout the drawings to refer to the same or like parts.

Figure 1:
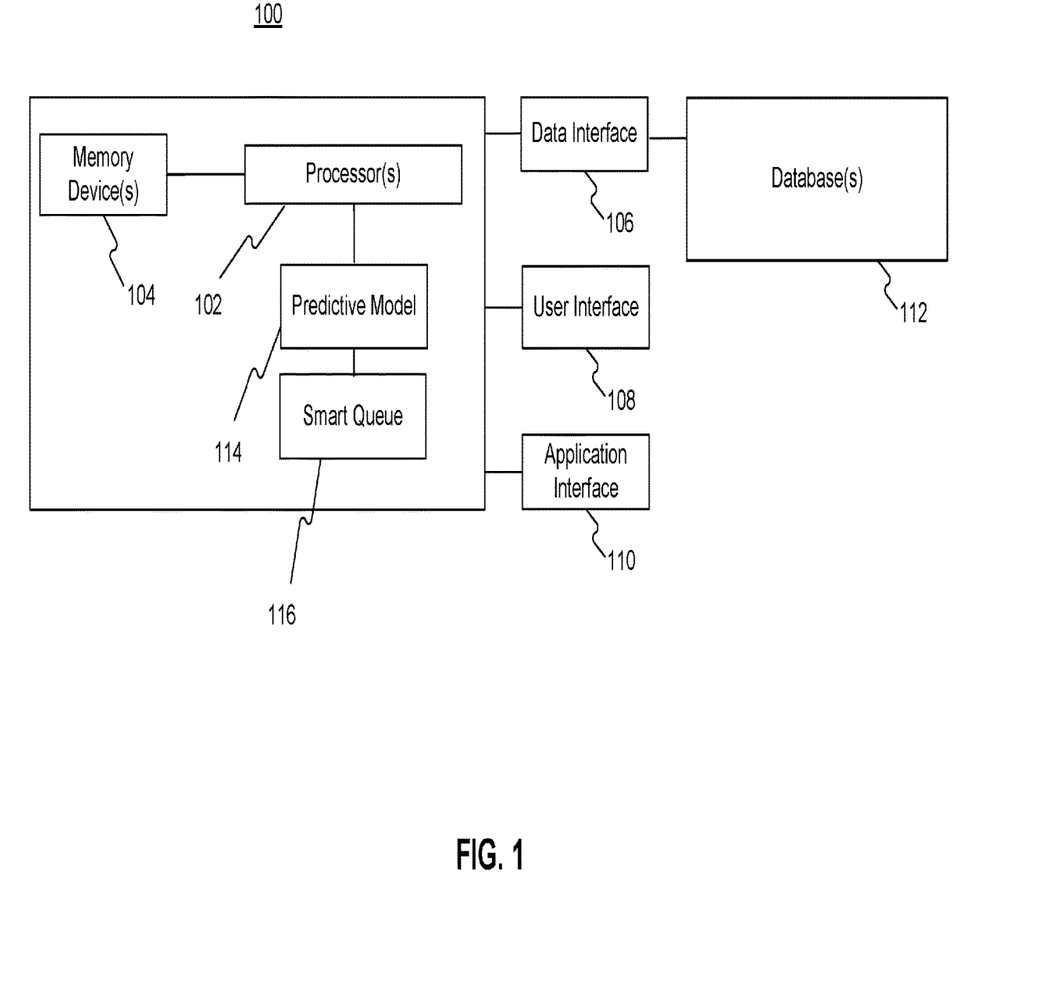
FIG. 1 is a block diagram illustrating an exemplary loan application queuing system, consistent with disclosed embodiments.

FIG. 1 is a block diagram illustrating an exemplary intelligent interface queuing system 100, consistent with disclosed embodiments. System 100 may include one or more dedicated processors 102, such as application-specific integrated circuits (ASICs), field-programmable gate arrays (FPGAs), or various other types of processors, coupled with one or more non-transitory processor-readable memory devices 104 configured for storing processor-executable code. The system 100 may also include one or more interfaces, such as a data interface 106, a user interface 108, and an application interface 110, to interact with databases 112, users, and other computing systems.

Figure 2:
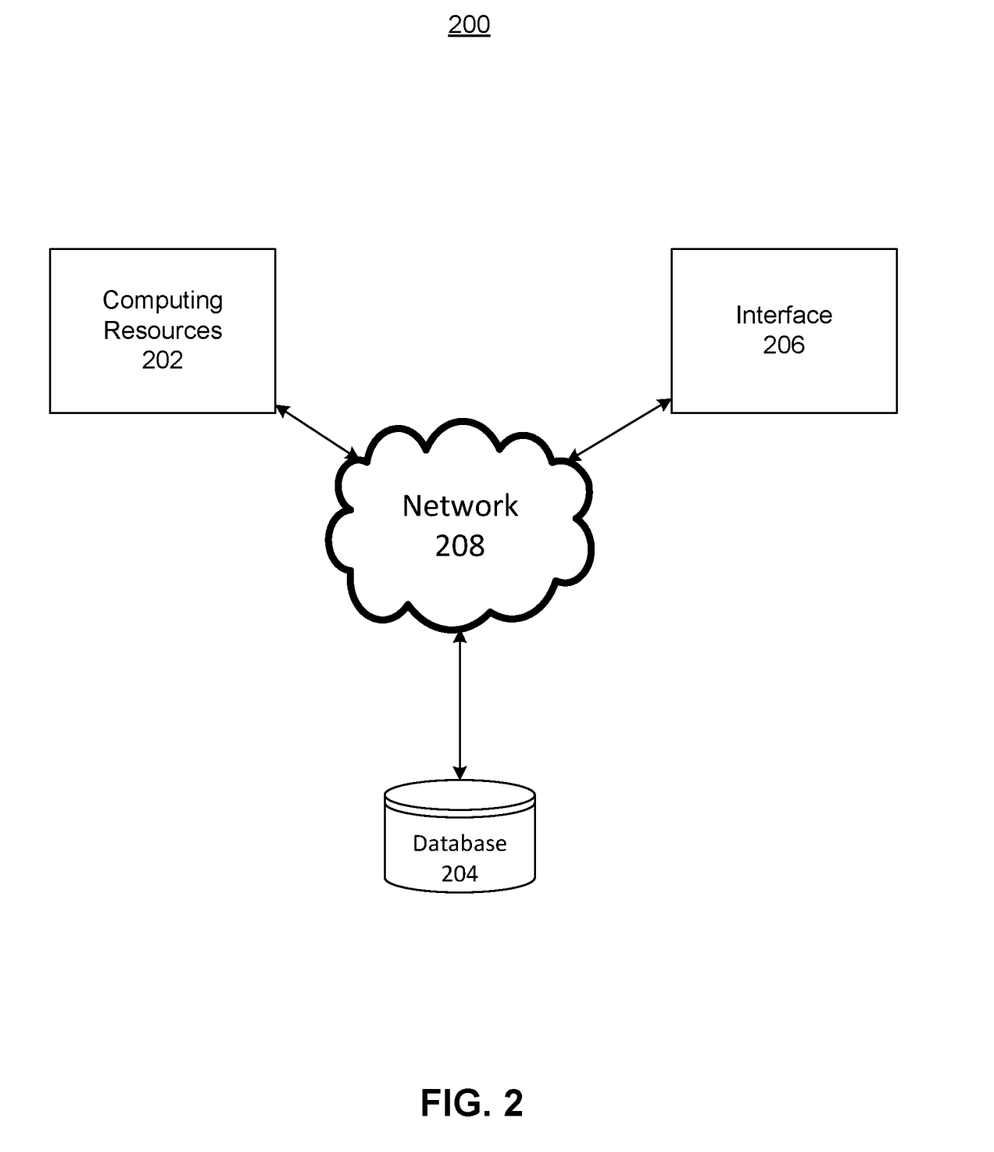
FIG. 2 is an exemplary cloud-computing environment for optimizing processing of loan applications using machine learning, consistent with disclosed embodiments.

In some embodiments, one or more processors 102 may operate as a part of a cloud-computing system. FIG. 2 depicts an exemplary cloud-computing system 200. System 200 can be configured to expose an interface for communication with other systems, including system 100 (FIG. 1). System 200 can include computing resources 202, which may include one or more processors 102. System 200 may also include other resources such as databases 204, communication interface 206, and the like. These components of system 200 can be configured to communicate with each other, or with external components of system 200, using a network 208. The particular arrangement of components depicted in FIG. 2 is not intended to be limiting. System 200 can include additional components, or fewer components. Multiple components of system 200 can be implemented using the same physical computing device or different physical computing devices.

Computing resources 202 can include one or more computing devices configurable to train data models. The computing devices can be special-purpose computing devices, such as graphical processing units (GPUs) or application-specific integrated circuits, or general-purpose computing devices. The computing devices can be configured to host an environment for training data models. For example, the computing devices can host virtual machines, pods, or containers. The computing devices can be configured to run applications for generating data models. For example, the computing devices can be configured to run Amazon Web Services (AWS) SageMaker, Tensorflow, or similar machine-learning training applications. Computing resources 202 can be configured to receive models for training from model optimizers, model storage devices, or other components of system 200. Computing resources 202 can be configured to provide training results, including trained models and model information, such as the type and/or purpose of the model and any measures of classification error.

Database 204 can include one or more databases configured to store data for use by system 200. For example, database 204 may store training data for machine learning or neural network training. The databases can include cloud-based databases (e.g., AMAZON WEB SERVICES S3 buckets) or on-premises databases.

Interface 206 can be configured to manage interactions between system 200 and other systems using network 208. In some aspects, interface 206 can be configured to publish data received from other components of system 200 (e.g., computing resources 202, database 204, or the like). This data can be published in a publication and subscription framework (e.g., using APACHE KAFKA), through a network socket, in response to queries from other systems, or using other known methods. In various aspects, interface 206 can be configured to provide data or instructions received from other systems to components of system 200. For example, interface 206 can be configured to receive instructions for generating data models (e.g., type of data model, data model parameters, training data indicators, training parameters, or the like) from another system and provide this information to computing resources 202. As an additional example, interface 206 can be configured to receive data including sensitive portions from another system (e.g. in a file, a message in a publication and subscription framework, a network socket, or the like) and provide that data to database 204.

Network 208 can include any combination of electronics communications networks enabling communication between components of system 200. For example, network 208 may include the Internet and/or any type of wide area network, an intranet, a metropolitan area network, a local area network (LAN), a wireless network, a cellular communications network, a Bluetooth network, a radio network, a device bus, or any other type of electronics communications network know to one of skill in the art. It is to be understood that system 200 is depicted merely as an example for implementing a cloud-computing system. It is also to be understood that for illustrative purposes, the description below may reference processor 102 and system 100 as the system configured to carry out the various operations. However, the references to processor 102 and system 100 are merely provided as examples and are not meant to be limiting. It is contemplated that computing resources 202 and system 200 may be configured to carry out the various operations disclosed herein without departing from the spirit and scope of the present disclosure.

When instructions are executed by processor 102, processor 102 may perform operations including analyzing a set of training data to build a predictive model 114 using machine learning. Processor 102 may also apply predictive model 114 to a queue of actions to intelligently prioritize the actions. For example, processor 102 may utilize predictive model 114 to analyze historical data to identify a likelihood for completing certain tasks or actions between a first party and a second party. Processor 102 may also utilize predictive model 114 to consider or learn a number of factors relevant to the completion of the tasks or actions. For instance, in some embodiments, predictive model 114 may take into account the interactions between the first party and the second party to determine how to prioritize the tasks. In some embodiments, predictive model 114 may also take into account whether the first party proactively or reactively engaged with the second party to determine how to prioritize the tasks.

In some embodiments, the first party may include a relationship manager working for a financial institution, the second party may include one or more entities arranging the loan applications (e.g., a dealerships), and the tasks may include one or more loan applications pending review by the relationship manager. Processor 102 may apply predictive model 114 to these loan applications to determine the values of these loan applications to the institution and prioritize these loan applications accordingly. Processor 102 may therefore provide the abilities to analyze historical data and intelligently prioritize future tasks, both of which cannot not be done by the relationship manager manually or mentally due to the high volume of loan applications and because most of the historical data is recorded in manners not readily understandable by the relationship manager. Furthermore, the relationship manager does not have the mental capacity to keep track of all interactions between the relationship manager and the various dealerships, let alone analyzing these interactions to identify factors relevant to the completion of the loan applications. Processor 102 can thus be utilized to improve the way the relationship managers manage and prioritize the loan applications pending their review.

In some embodiments, values of the loan applications may be determined by taking into consideration the probabilities of the institution funding the loan applications. In some embodiments, the predictive model may predict the probabilities of the institution funding the loan applications both for situations where the institution, through actions by the relationship manager, (1) proactively engages the loan arranging entities (e.g., the dealerships) to negotiate the terms and (2) reactively engages the loan arranging entities to negotiate the terms. In this manner, processor 102 may utilize predictive model 114 to determine whether proactively engaging the loan arranging entities can positively affect the institution's likelihood of winning the bid to fund the loan applications.

In some embodiments, processor 102 may present the prediction results to users, e.g., relationship managers working for the institutions, to help the relationship managers decide whether to proactively engage any of the loan applications pending actions in their respective working queues. In some embodiments, processor 102 may rank the prediction results to form smart working queues 116 for the relationship managers. Processor 102 may report smart working queues 116 to the relationship managers through user interface 108. Smart working queues 116 may present the loan applications to the relationship managers according to a ranking order determined based on the prediction results.

In some embodiments, processor 102 may build predictive model 114 as a gradient boosting machine (GBM) model. Gradient boosting is a machine-learning technique for regression and classification. In some embodiments, the gradient boosting machine may be configured to produce predictive model 114 as an ensemble of predictive models, e.g., decision trees, which can be utilized to predict the probability of an institution funding a loan application both with and without proactive engagement of a relationship manager working for the institution.

In some embodiments, processor 102 may specify a dependent variable of predictive model 114 to represent the outcome of the loan applications. For example, in some embodiments, the outcome may indicate whether a loan application has reached the status of "funded" or "not funded" within a specified time period (e.g., 30 days) from the application submission date. In some embodiments, unfunded loan applications may expire after the time period has lapsed after their respective submission dates.

In some embodiments, processor 102 may build predictive model 114 using training data containing historical loan applications. The historical loan applications may include applications that have either been funded by the institution or have expired without being funded by the institution. In some embodiments, processor 102 may retrieve the historical loan applications from one or more databases 112 maintained by the institution. In some embodiments, database 112 may record historical loan applications submitted to the institution along with their corresponding status updates. Records stored in database 112 may be updated, for example, every time a relationship manager at the institution or a sales associate at a dealership works on a corresponding loan application recorded in database 112.

In some embodiments, processor 102 may also specify different categories of descriptive attributes of historical loan applications for predictive model 114 to identify characteristics that are important to the outcomes of the historical loan applications (e.g., funded or not funded). One of the categories may include, for example, applicant's credit information, such as a FICO® score, a credit rating, or the like. Other categories may include, for example, deal structure (e.g., loan amount, down payment, annual percentage rate, etc.), line of credit information (including, e.g., whether the applicant has a business line of credit through the institution), approval status (including, e.g., whether the loan is approved with any conditions or the like), dealer information (including, e.g., service levels, dealer credit, etc.), and dynamic features that may change over time (including, e.g., age of the loan application, level of dealer engagement, etc.). It is contemplated that additional or alternative features that can capture the dealer relationship, deal structure, and credit information, may also be specified without departing from the spirit and scope of the present disclosure.

In some embodiments, processor 102 may further specify a category of descriptive attribute referred to as "engagement information." Engagement information for a loan application may indicate, for example, whether or not a relationship manger engaged the dealership (or the loan-arranging entity in general) to work on the loan application. In some embodiments, the engagement information may be recorded in database 112 and processor 102 may retrieve the engagement information from database 112 to form a part of the training data.

In some embodiments, the engagement information for a loan application may further include data regarding whether a relationship manger proactively or reactively engaged the dealership (or the loan arranging entity in general) to work on the loan application. Processor 102 may, for example, request the relationship managers to indicate whether they proactively or reactively engaged the loan arranging entities to work on loan applications. Processor 102 may record the engagement information received from the relationship managers in database 112 accordingly.

It is contemplated that knowing whether a relationship manger proactively or reactively engaged a dealership to work on a loan application may further improve the accuracy of predictive model 114. Generally, if a dealership contacts a relationship manager to solicit assistance during the underwriting and funding process (in other words, the relationship manager reactively engages the dealership to work on the loan application), the relationship manager may have a greater chance of winning the bid for the institution to fund the loan application. On the other hand, more effort may be required of the relationship manager if the relationship manager proactively engages the dealership to work on the loan application. This is because the dealership may have already started working with another institution to fund the loan, in which case the dealership may only consider the relationship manager's bid if the bid is more attractive compared to that offered by the other institution. It is also possible that the loan has already been funded by the other institution, in which case proactively engaging the dealership to work on the loan application will not be worthwhile for the relationship manager. Therefore, knowing whether the relationship manger proactively or reactively engaged dealerships to work on loan applications may improve the accuracy of predictive model 114, and in some embodiments, processor 102 may build predictive model 114 using training data that contains engagement information for the historical loan applications.

In some embodiments, processor 102 may organize the training data as a set of "snapshots." For example, in some embodiments, processor 102 may organize the training data as a set of ten snapshots, and each snapshot may include historical loan applications previously pending in a working queue of a relationship manager. Furthermore, in some embodiments, each snapshot may specify a time window, and only historical loan applications pending within the time window may be included in that snapshot. For example, the time window may be specified as a seven-day window. In this manner, the training data may include a snapshot containing historical loan applications pending in the working queue of the relationship manager within the last seven days. The snapshot may also contain information regarding the various categories of descriptive attributes associated with the historical loan applications. Such descriptive attributes may include, e.g., applicant's credit information, deal structure, line of credit information, approval status, dealer information, as well as dynamic features, as described above.

In some embodiments, processor 102 may create snapshots according to a predetermined interval. For example, in some embodiments, processor 102 may create a snapshot every three days (with each snapshot covering a seven-day window) so that there is an overlap of loan applications between two adjacent snapshots. This overlap may provide continuity that allows predictive model 114 to analyze loan applications as they progress through the approval process, which may in turn help improve the accuracy of predictive model 114. In some embodiments, processor 102 may discard older snapshots and keep only a predetermined number of snapshots in the training data. In some embodiment, processor 102 may keep ten snapshots in the training data. It is to be understood, however, that processor 102 may keep a different number of snapshots without departing from the spirit and scope of the present disclosure.

Additionally, in some embodiments, processor 102 may select to include only matured loan applications in the training data. Matured loan applications may include applications that have either been funded by the relationship manager's institution, or have expired without being funded by the institution. In some embodiments, processor 102 may exclude loan applications that have been cancelled.

In some embodiments, processor 102 may filter the training data to only include loan applications that are consistent with the relationship manager's lines of business. For example, if the relationship manager only works with certain types of loan applications (e.g., truck loan applications), processor 102 may select to include only those types of loan applications in the training data. It is contemplated that filtering training data in this manner may help tailor predictive model 114 for a particular relationship manager, which may in turn help improve the accuracy of predictive model 114 for that particular relationship manager.

Once processor 102 finishes building predictive model 114, processor 102 may utilize predictive model 114 to predict a first probability of the institution funding a new loan application if the institution, through actions by the relationship manager, proactively engages the loan arranging entity of the loan application (the dealership in the example above). Processor 102 may also utilize predictive model 114 to predict a second probability of the institution funding the loan application if the institution, through actions by the relationship manager, reactively engages the loan arranging entity. In some embodiments, processor 102 may report the difference between the first and second probabilities through user interface 108 to help the relationship manager decide whether it is worthwhile for the relationship manager to proactively engage the loan arranging entity. The difference between the first and second probabilities may be referred to as a model score. Generally, a greater model score suggests that proactively engaging the dealership will produce a greater impact on the probability of the institution funding the loan application. It is to be understood that processor 102 may continue to train predictive model 114 on an ongoing basis as new records are being stored into database 112.

In some embodiments, processor 102 may utilize predictive model 114 to predict the first and second probabilities for each loan application pending actions by the relationship manager. Processor 102 may then calculate and report a model score for each loan application to the relationship manager through user interface 108. The relationship manager may use user interface 108 to rank the loan applications based on their corresponding model scores. For example, the relationship manager may choose to rank the loan applications based on the model scores in a descending order. In this manner, the relationship manager may determine which loan applications can benefit the most from the relationship manager's proactive engagement based on the predicted model scores.

Processor 102 may also apply additional mathematical operations to the model scores to calculate a final score for each loan application. For example, in some embodiments, processor 102 may multiply the model scores by appropriate scalars to calculate the financial values of the loan applications. In some embodiments, processor 102 may determine appropriate scalars based on the type of the loan applications. For example, personal loans and commercial loans may be assigned different scalars by the institution. Alternatively or additionally, loans for different dollar amount may be assigned different scalars.

In some embodiments, processor 102 may also take into account the expected profitability of the loans and scale the financial values of the loan applications accordingly. This "profitability scalar" may be used to increase the financial value of a loan that would otherwise garner a lower financial value or vice versa. For example, in some embodiments, processor 102 may score a highly profitable loan with a higher financial value compared to a loan that has a lower profitability, even if predictive model 114 suggests that the highly profitable loan is less likely to be funded compared to the loan that has the lower profitability.

Processor 102 may further apply time factor adjustments to calculate the final scores. For example, in some embodiments, processor 102 may divide the financial value calculated for each loan application by an average working time required to work on loan applications of the same type. In this manner, processor 102 may be able to calculate a final score for each loan application that can represent the financial value of the loan application per unit of time. The relationship manager may further use user interface 108 to rank the loan applications based on their corresponding financial values per unit of time. The relationship manager may, for example, choose to rank the loan applications based on their financial values per unit of time in a descending order. The relationship manager may determine which loan applications can benefit the most from the relationship manager's proactive engagement per unit of time.

In some embodiments, processor 102 may further adjust the financial values of the loan applications based on certain characteristics of the loan applications. For example, if the relationship manager has a number of loan applications from the same dealership, processor 102 may recognize these loan applications as a group and increase the financial values of this group of loan applications. For example, the relationship manager may increase the financial values for a group of loan applications because the relationship manager may be able to handle this group of loan applications more efficiently (e.g., with a single phone call to the dealership rather than multiple phone calls to multiple dealerships). It is contemplated that processor 102 may increase or decrease the financial values of the loan applications based on other characteristics of the loan applications without departing from the spirit and scope of the present disclosure.

It is to be understood that while predictive model 114 described above referenced a gradient boosting machine model, such a reference is merely presented as an example and is not meant to be limiting. It is contemplated that processor 102 may build predictive model 114 using other machine-learning techniques without departing from the spirit and scope of the present disclosure. For example, processor 102 may build predictive model 114 using logistic regression, naive Bayes, neural networks (e.g., multilayer perceptron, back-propagation, and other deep architectures), support vector machines, random forests, as well as other boosting algorithms or binary classification algorithms that can be adapted to output probabilities.

It is also to be understood that processor 102 may be configured to build more than one predictive model 114 depending on the needs of the institution utilizing intelligent interface queuing system 100. For example, a small institution having a few relationship managers working for it may configure processor 102 to build just one predictive model 114 and utilize the predictive model 114 to process all loan applications pending actions by the institution collectively. On the other hand, if the institution has different lending units setup to process different types of loans, the institution may configure processor 102 to build one or more predictive models 114 for each lending unit. Alternatively or additionally, the institution may configure processor 102 to build a predictive model 114 for each relationship manager. Likewise, in some embodiments, the institution may configure processor 102 to build different predictive models 114 for different dealerships that it conducts business with, or for different geographic regions or other types of clusters (e.g., clusters based on credit profiles such as prime, near prime, subprime, etc.) without departing from the spirit and scope of the present disclosure.

Figure 3:
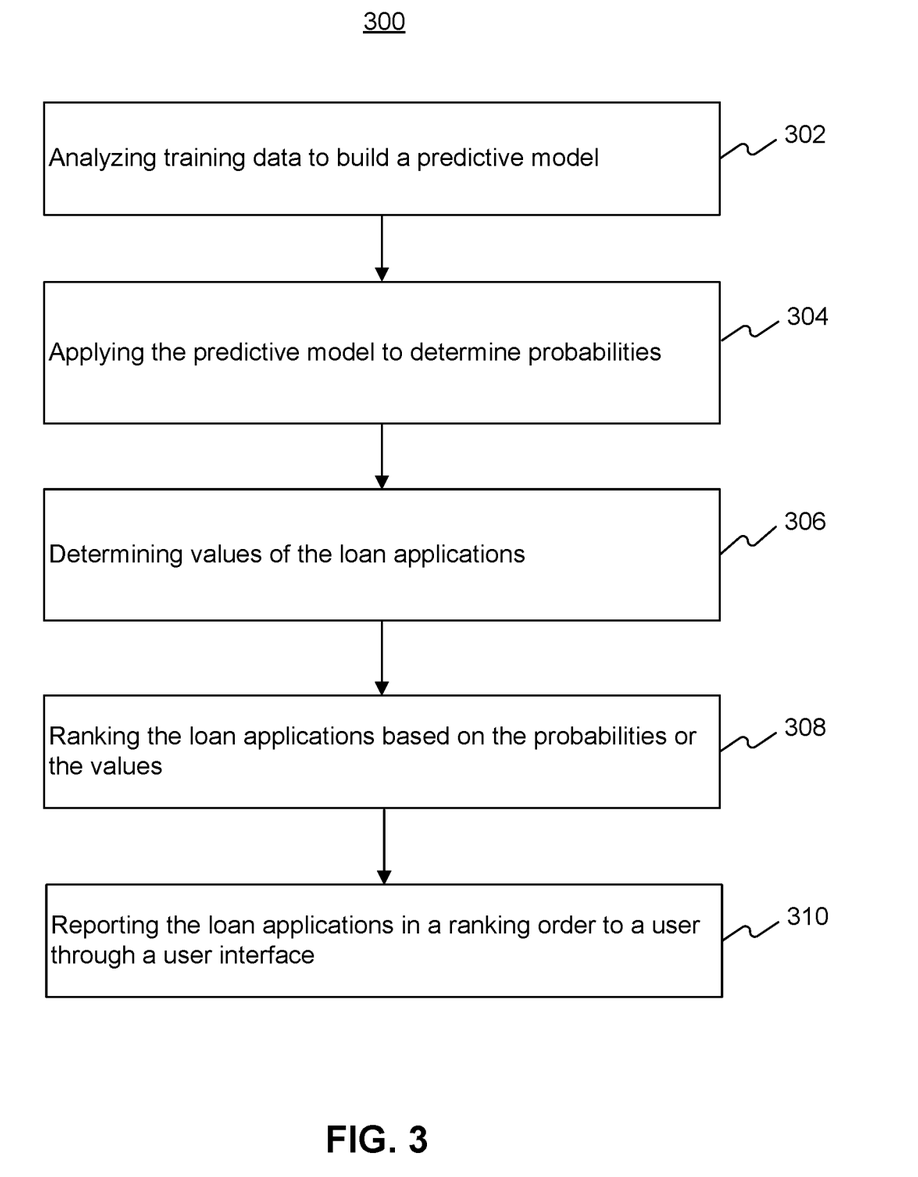
FIG. 3 is a flow diagram of an exemplary method for optimizing processing of loan applications, consistent with disclosed embodiments.

Referring now to FIG. 3, there is shown a flow diagram illustrating an exemplary method 300 for optimizing processing of loan applications. While method 300 is described herein as a sequence of steps, it is to be understood that the order of the steps may vary in other implementations. In particular, steps may be performed in any order, or in parallel. It is to be understood that steps of method 300 may be performed by one or more processors, computers, servers, controllers or the like.

In some embodiments, method 300 may be performed by intelligent interface queuing system 100 (as depicted in FIG. 1). At step 302, method 300 may analyze training data to build a predictive model. In some embodiments, method 300 may build the predictive model utilizing a machine-learning system trained using the training data. The machine-learning system may include a gradient boosting machine. In some embodiments, the training data may include snapshots of historical data obtained at different times. Each snapshot may include historical loan applications previously pending in a working queue of a user (e.g., a relationship manager working for an institution utilizing method 300). Each snapshot may be created according to rules described above. In some embodiments, applications included in the snapshots must have been funded or expired.

At step 304, method 300 may apply the predictive model to new loan applications to determine the probabilities that the institution will fund the new loan applications. Specifically, method 300 may determine a first probability of the institution funding a new loan application if the institution, through actions by its relationship manager, proactively engages a loan arranging entity of that loan application. Method 300 may also determine a second probability of the institution funding that loan application if the institution, through actions by its relationship manger, reactively engages the loan arranging entity of that loan application.

Figure 4:
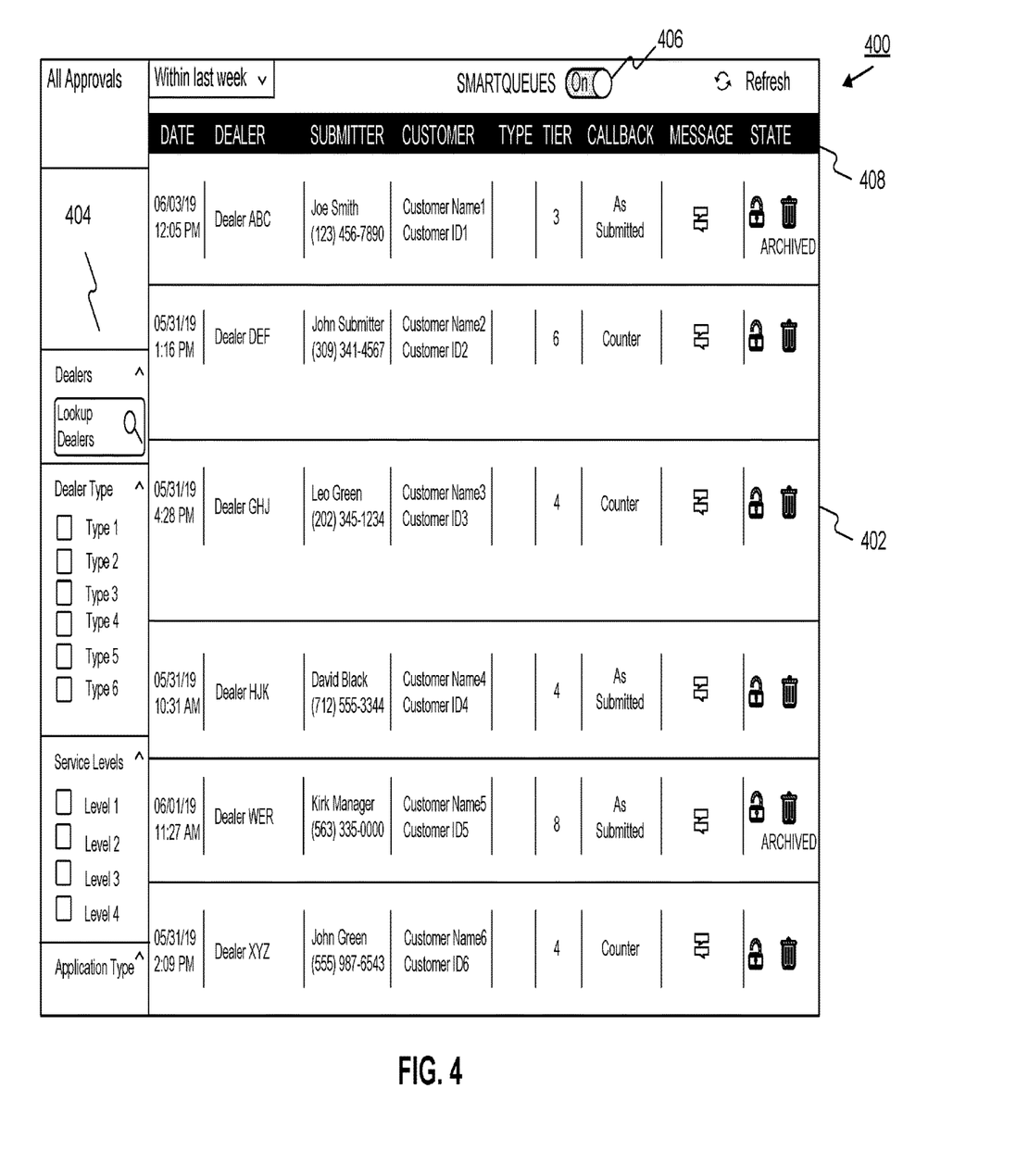
FIG. 4 is an illustration depicting an exemplary user interface, consistent with disclosed embodiments.

In some embodiments, the institution may receive the loan applications from loan arranging entities (e.g., dealerships). In some embodiments, the loan arranging entities may send the loan applications to one or more intermediaries, which may then distribute the loan applications to multiple financial institutions. The institution may record the information received and present the information via an interface to the relationship manager. FIG. 4 is an illustration depicting an exemplary interface 400 that may be utilized to present the loan applications to a relationship manager. The relationship manager may utilize interface 400 to work on the loans back and forth with the loan arranging entities (e.g., dealerships). For example, the relationship manager may provide a response back to the dealership with proposed loan terms for a loan application 402 and wait for further communications from the dealership. The loan application 402 may remain pending in the queue until it is funded, cancelled, or otherwise acted upon by either the relationship manager or the dealership.

Returning to FIG. 3, at step 306, method 300 may determine a value of each new loan application. In some embodiments, the value of each new loan application may be determined based on the difference between the first and second probabilities determined for that loan application. In some embodiments, the value of each new loan application may be multiplied by a scalar provided for that loan application. In some embodiments, the value of each new loan application may be further divided by an average working time required for that loan application. Furthermore, in some embodiments, the values of some loan applications may be adjusted based on certain characteristics of the loan applications, including, e.g., the expected profitability of the loan applications and the like.

In some embodiments, step 306 may be carried out upon receiving a new application. In this manner, method 300 may determine the value of the new loan application to assist the relationship manager in deciding whether to proactively engage the loan application. In some embodiments, step 306 may also be carried out when an existing application receives updated information. For example, if a loan application receives a co-signer, the value of the loan application may be re-evaluated. Likewise, if the dealership responds to terms proposed by the relationship manager for a loan application, the value of that loan application may be re-evaluated based on the response receive. It is contemplated that step 306 may be carried out in other instances to evaluate or re-evaluate loan applications without departing from the spirit and scope of the present disclosure.

In some embodiments, step 306 may be carried out to re-evaluate loan applications throughout their lifecycle. In some embodiments, the age of the loan applications may be a dynamic feature taken into consideration by step 306, which may update the scores calculated for the loan applications as the loan applications progress through their lifecycle. In some embodiments, users (e.g., relationship managers) may also utilize a refresh button provided on the user interface 400 to initiate the re-evaluation process.

At step 308, method 300 may rank the new loan applications based on their first and second probabilities and/or their determined values. At step 310, method 300 may report the new loan application in a ranking order to the user. The ranking order may suggest to the user (e.g., the relationship manager working for the institution) which loan applications can benefit the most from the user's proactive engagement. In some embodiments, the user may customize the report and modify the ranking based on their preferences. The user may, for example, customize the ranking by applying one or more data filters 404 made available through the user interface 400. The user may request display of only loan applications sent from a certain dealerships or intermediaries. In some embodiments, the user may have the option to turn off the ranking using a switch 406 provided on the user interface 400. The user may then choose to sort the loan applications using various types of data categories 408 without departing from the spirit and scope of the present disclosure.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system, comprising:
one or more databases including training data stored therein;
one or more memory devices storing instructions;
one or more processors configured to execute the instructions; and
one or more interfaces for managing interactions between the one or more processors and the one or more databases,
the one or more processors configured to execute the instructions to perform operations comprising:
analyzing the training data stored in the one or more databases, and building a predictive model based on the analyzed training data;
applying the predictive model to a plurality of loan applications, and determining for each loan application of the plurality of loan applications:
a first probability of an institution funding the loan application if the institution proactively engages a loan-arranging entity of the loan application; and
a second probability of the institution funding the loan application if the institution reactively engages the loan-arranging entity;
reporting the first and second probabilities to a user through a user interface of the one or more interfaces;
updating the predictive model;
determining a value of each loan application of the plurality of loan applications by:
determining differences between the first and second probabilities for each respective loan application; and
multiplying the differences by scalars provided for the loan applications, and determining scaled values;
ranking the plurality of loan applications based on the first and second probabilities; and
reporting the plurality of loan applications in a ranking order to the user through the user interface,
wherein the analyzing the training data includes building the predictive model utilizing a machine-learning system trained using the training data, and
wherein the machine-learning system comprises a gradient boosting machine.

2. The system of claim 1, wherein the training data comprises historical loan applications and engagement information about the historical loan applications.

3. The system of claim 1, wherein the training data includes a plurality of snapshots of historical data obtained at different times.

4. The system of claim 3, wherein each snapshot comprises a plurality of loan applications previously pending in a working queue of the user.

5. The system of claim 4, wherein each of the previously pending applications has a status of one of funded or expired.

6. The system of claim 1, wherein the operations further comprise:
reporting the respective values to the user through the user interface.

7. The system of claim 1, wherein the loan-arranging entity is an automobile dealership.

8. The system of claim 1, wherein the determining the values further comprises:
dividing the scaled values by average working times required of the loan applications, and determining values of the loan applications per unit of time.

9. A method, comprising:
analyzing training data stored in a database, and building a predictive model based on the analyzed training data;

applying the predictive model to a plurality of loan applications, and determining for each loan application of the plurality of loan applications:
  a first probability of an institution funding the loan applications if the institution proactively engages loan-arranging entities of the loan applications; and
  a second probability of the institution funding the loan applications if the institution reactively engages the loan-arranging entities of the loan applications;
updating the predictive model;
ranking the loan applications based on the first and second probabilities;
reporting the loan applications in a ranking order to a user through a user interface; and
  determining a value of each loan application of the plurality of loan applications by:
    determining differences between the first and second probabilities for each respective loan application; and
    multiplying the differences by scalars provided for the loan applications, and determining scaled values,
  wherein the analyzing the training data includes building the predictive model utilizing a machine-learning system trained using the training data, and
  wherein the machine-learning system comprises a gradient boosting machine.

10. The method of claim 9, further comprising:
reporting the respective values to the user through the user interface.

11. The method of claim 9, wherein the training data comprises historical loan applications and engagement information about the historical loan applications.

12. The method of claim 9, wherein the training data includes a plurality of snapshots of historical data obtained at different times.

13. The method of claim 12, wherein:
each snapshot comprises a plurality of loan applications previously pending in a working queue of the user; and
each of the previously pending applications has a status of one of funded or expired.

14. The method of claim 9, wherein the determining the values further comprises:
dividing the scaled values by average working times required of the loan applications, and determining values of the loan applications per unit of time.

15. The method of claim 9, further comprising:
reporting the first and second probabilities to the user through the user interface.

16. The method of claim 9, wherein the loan-arranging entity is an automobile dealership.

17. A non-transitory memory storing instructions that, when executed by at least one processor, cause a system to perform operations comprising:
analyzing training data stored in a database, and building a predictive model based on the analyzed training data;
applying the predictive model to a plurality of loan applications, and determining for each loan application of the plurality of loan applications:
  a first probability of an institution funding the loan applications if the institution proactively engages loan-arranging entities of the loan applications; and
  a second probability of the institution funding the loan applications if the institution reactively engages the loan-arranging entities of the loan applications;
updating the predictive model;
ranking the loan applications based on the first and second probabilities;
  reporting the loan applications in a ranking order to a user through a user interface;
  determining a value of each loan application of the plurality of loan applications by:
    determining differences between the first and second probabilities for each respective loan application; and
    multiplying the differences by scalars provided for the loan applications, and determining scaled values; and
  reporting the respective values to the user through the user interface;
  wherein the analyzing the training data includes building the predictive model utilizing a machine-learning system trained using the training data, and
wherein the machine-learning system comprises a gradient boosting machine.

18. The non-transitory memory of claim 17, wherein the training data comprises historical loan applications and engagement information about the historical loan applications, and the training data including a plurality of snapshots of historical data obtained at different times.

19. The non-transitory memory of claim 17, wherein the loan-arranging entity is an automobile dealership.

20. The non-transitory memory of claim 17, wherein the determining the values further comprises:
dividing the scaled values by average working times required of the loan applications, and determining values of the loan applications per unit of time.

* * * * *